Fig. 1.

John A. Negri, INVENTOR.

July 24, 1951          J. A. NEGRI          2,561,631

AUTOMATIC GLASS WASHING AND STERILIZING MACHINE

Filed Dec. 27, 1944          7 Sheets—Sheet 2

JOHN A. NEGRI,
INVENTOR.

BY
ATTORNEY

July 24, 1951  J. A. NEGRI  2,561,631
AUTOMATIC GLASS WASHING AND STERILIZING MACHINE
Filed Dec. 27, 1944  7 Sheets-Sheet 5

JOHN A. NEGRI,
INVENTOR.

July 24, 1951  J. A. NEGRI  2,561,631
AUTOMATIC GLASS WASHING AND STERILIZING MACHINE
Filed Dec. 27, 1944  7 Sheets-Sheet 6

JOHN A. NEGRI,
INVENTOR.

BY

ATTORNEY

July 24, 1951     J. A. NEGRI     2,561,631
AUTOMATIC GLASS WASHING AND STERILIZING MACHINE
Filed Dec. 27, 1944     7 Sheets-Sheet 7

JOHN A. NEGRI,
INVENTOR.

Patented July 24, 1951

2,561,631

UNITED STATES PATENT OFFICE 2,561,631

AUTOMATIC GLASS WASHING AND STERILIZING MACHINE

John A. Negri, Santa Monica, Calif.

Application December 27, 1944, Serial No. 569,995

19 Claims. (Cl. 134—57)

My invention relates to washing and sterilizing machines and more particularly to a machine better suited for washing and sterilizing glassware commonly used for beverage purposes in public or private establishments such as bars, restaurants, beverage fountains, hotels, clubs and the like.

Correct sanitation has become a major concern both to the operators and the health authorities. Practically all communities now have specific laws governing this subject. Proper sterilization eliminates harmful bacteria, which otherwise might be transferred from one person to another.

Heretofore, it has been the custom of such establishments as those already mentioned, to have their glassware washed and sterilized manually. The major drawback to this method, aside from the cost of labor, is the limitations which the human hand can endure in the temperature of the water and the strength of the sterilizing solution contained therein.

There are some establishments which, at present, have in use mechanical devices for washing and sterilizing. However, these devices require a great deal of attention to operate, and are designed primarily for washing dishes with the aid of soap. Because soap is considered impractical for washing glassware, some operators substitute one of the more satisfactory chemicals for the soap in their dishwashing machines, although this is costly since the solution is either dissipated or its effectiveness is greatly minimized after each operation, making it necessary to supply to the solution new quantities of the chemical from time to time.

The present invention is designed to aid in overcoming these disadvantages, as follows: by providing a machine embodying the automatic operation of washing, sterilizing and rinsing in a series of unbroken cycles during which rest periods occur in the individual cycles permitting a thorough washing, sterilizing and rinsing of the objects being cleansed unless such a cycle is for some reason interrupted, and if interrupted an automatic mechanism provided for the purpose restores the machine parts to their original positions whereupon to perform a complete operational cycle when the machine is again put into operation; by providing a machine embodying the automatic operation of a series of signal indications to indicate the status quo of the machine when its master switch has been closed; by providing a machine embodying the automatic operation of draining the sterilizing solution from the machine at the expiration of a predetermined number of usings and for setting the machine to operate according to the predetermined number; by providing means automatically actuable for filling the sterilizing tank with fresh water upon the completion of the predetermined number of usings of the chemical solution contained therein and while at the same time de-actuating other mechanism and operating a signal to indicate to the operator that certain requirements in the operation of the machine must be met before it can again be put into effective operation; and providing further means manually operable, when the machine's master switch is open, to flush at will the sterilizing tank, and means automatically responsive to the actuation of said manually operable means to drain the sterilizing tank of said flushing solution.

With the foregoing and other objects in view, the invention still further resides in the novel arrangement and novel combination of parts and the novel details of construction hereinafter more fully described and claimed, it being understood that the invention is not limited in its application to the details of construction and arrangement of parts illustrated in the accompanying drawings, since the invention is capable of other embodiments and of being practiced or carried out in possible various ways. Also, it is to be understood that the phraseology or terminology employed herein is for the purposes of description and not of limitation, and it is not intended to limit the herein claimed invention beyond the requirements of prior art.

Referring to the accompanying drawings, which illustrate what is at present deemed to be a preferred embodiment of the invention.

Referring in detail to the drawing, the preferred form of the invention therein shown comprises an upstanding rectangularly shaped supporting casing A, the upper portion of which carries the glassware receptacle B, subjacent to which is the drawer-like strainer tray C, spaced below which is the spout-carrying drain pan D. Below said drain pan is located the combination pump and motor E, and the casing F which contains the timing mechanism G together with the driving means H therefor, said means and mechanism being both detailed in Fig. 6.

The upper end of the casing A is provided with a spacious rectangular opening, there being mounted in the rear side portion of said opening a stationary arcuate sheath 10 of the roll-top desk type with which cooperates the segmentally cylindrical, pivotally mounted cover member 11 having an operating handle 12.

Within the aforesaid opening in the top of the casing A is fitted in a fixed manner a rectangular angle iron rim member 13 within which is removably seated the tray portion 14 of the glassware receptacle B, said tray having a screen floor 15 to support glassware (samples 16 and and 17 of which are shown) during the cleansing operation.

Figure 3:
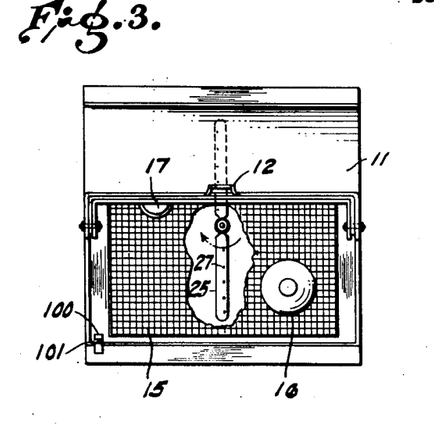
Fig. 3 is a plan of the machine as viewed from line 3—3 on Fig. 2.
Figure 4:
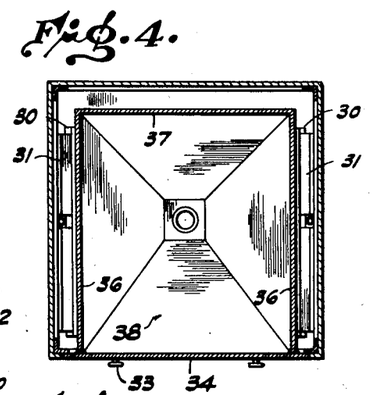
Figs. 4 and 5 are sections taken respectively on section indicating lines 4—4 and 5—5 on Fig. 2.

Subjacent to said rim member and to the tray 14 supported thereon is mounted a drainage apron 20 which is downwardly inclined from front to rear, the front side of said apron having across it a horizontal flange 21 which is welded or otherwise secured to the overlying part of the rim member 13. Along its lower side portion said apron is furnished with a downwardly directed lip 22 at the front side of a spacious discharge opening 23, the back side of said opening being bounded by the lower end portion of the aforementioned arcuate door sheath 10. The front part of said apron is stepped downwardly at 24 so as to provide an operating clearance for the revolvable spray arms 25 rotatably carried by the upper end of a supply pipe 26. Said spray arms are shown having rows of spray openings 27 disposed in such a manner that they direct inclined streams of the spray against the glassware and at the same time cause the reactive force caused by the issuing liquid to rotate said spray arms, as indicated by the arrow in Fig. 3. The object of causing this automatic rotation of the spray arms is to distribute the cleansing fluid over the glassware in a more even, efficient manner.

Figure 2:
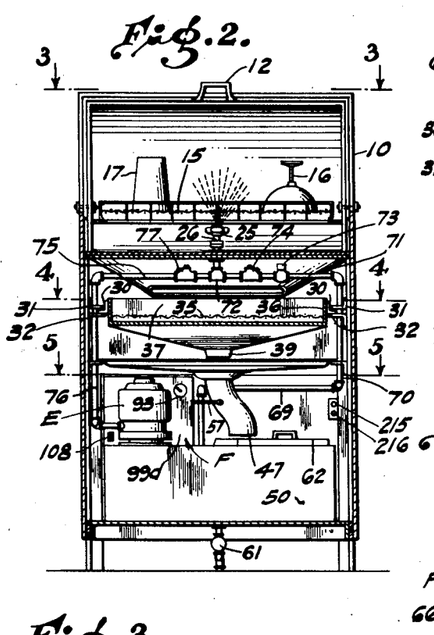
Fig. 2 is a section on line 2—2 of Fig. 1, on a smaller scale, with the cover open.

The liquid flowing off from the apron 20 is directed into the strainer unit C to the right and left sides of which are attached horizontal runners 30 (see Fig. 2), each runner sliding between an upper guide rail 31 and lower guide rail 32 attached to its side of the casing (see Fig. 2). Owing to this arrangement the operator, by grasping the handle 33 carried by the front wall 34 of this unit, can withdraw the whole unit from the casing to the desired extent, this being necessary when removing from the screen portion 35 of this unit any debris which has collected thereon. Said screen 35 is shown inclined downwardly from rear to front so that any refuse matter deposited thereon will have a tendency to wash forwardly and away from the spot on the screen where the water or solution first falls. This unit C includes side walls 36 and a back wall 37 of less height than its front wall 34, and also a hopper like bottom wall or floor portion 38 having a central discharge spout 39. The unit's front wall 34 is furnished with a downward extension 40 to close the spacious opening required in the front of the casing for the complete withdrawal of the unit.

Subjacent to the unit C the casing is provided with an internal ledge 41 which supports the rectangular pan member 42 of the drainage unit D, substantially all portions of said pan inclining downwardly toward its center where it is furnished with a short, downwardly directed stationary outlet spout 43. A broadly cup-shaped hanger 45 has around its upper end a flange 46 welded or otherwise secured to the bottom of the pan 42 radially spaced away from said outlet spout 43. This cup-shaped hanger is furnished with a spacious, circular central opening which receives the upper end portion of an inclined swingable spout 47, the upper end of this spout loosely surrounding said stationary spout 43 and being furnished with an external bearing flange 48 which rests turnably upon the bottom of said cup-shaped hanger 45.

Below the swingable spout 47 is stationed a rectangular tank 50 which is closed in on all sides except for an arcuate slot 51 (see Fig. 5). Below said slot this tank is furnished with a partition 52 which extends completely thereacross, but terminates in a downwardly spaced relation to the top of the tank. Said partition divides the tank into a compartment 53 for the sterilizing liquid 54, and a drain compartment 55. The reason for terminating the partition 52 below the top of the tank is to permit any abnormal excess amount of the liquid in the compartment 53 to overflow into said drain compartment. The aforesaid arcuate slot 51 has one end portion directly under the path along which the discharge end of the spout 47 swings, and is so positioned that said spout when in the full line position of Fig. 1 will discharge therethrough into the drain compartment 55 and when said spout is in the dotted line position of said view will discharge into the compartment 53 which contains the sterilizer.

Said swingable spout carries a downwardly directed stud 56 (see Fig. 10) to which is pivotally connected the arm 57 of the spout-swinging mechanism, later described in detail.

The aforesaid drain compartment 55 has an outlet pipe 58 connecting it to the drain pipe 59. The sterilizing compartment or reservoir 53 also has an outlet pipe section 60 in communication with the drain pipe 59. Said pipe section 60 is furnished with a normally closed, solenoid operable drain valve 61. Said tank 50 has a hinged lid 62 to cover an opening in its top wall 63, said lid being located near the cabinet door 64, in order that the attendant may conveniently from time to time supply the required chemical to the sterilizing solution.

At times it is desirable to flush out the tank compartment 53 in order to maintain it in a condition of maximum sanitation. For this purpose a hot water pressure supply line 65 is led through the back of the main casing and is led angularly to a quadrilaterally arranged spray pipe 66 which is furnished with rows of spraying openings 67 positioned to direct the cleansing spray against the inner surfaces of all four walls of the tank. The purpose of this spraying arrangement is to prevent scale, alkali or other foreign matters from adhering to the walls of the tank, as well as to facilitate cleaning the tank. The hot water supply pipe 65 is provided with a normally closed, solenoid operated water valve 68 current to which is either manually or automatically controlled, in the manner hereinafter described.

Figure 1:
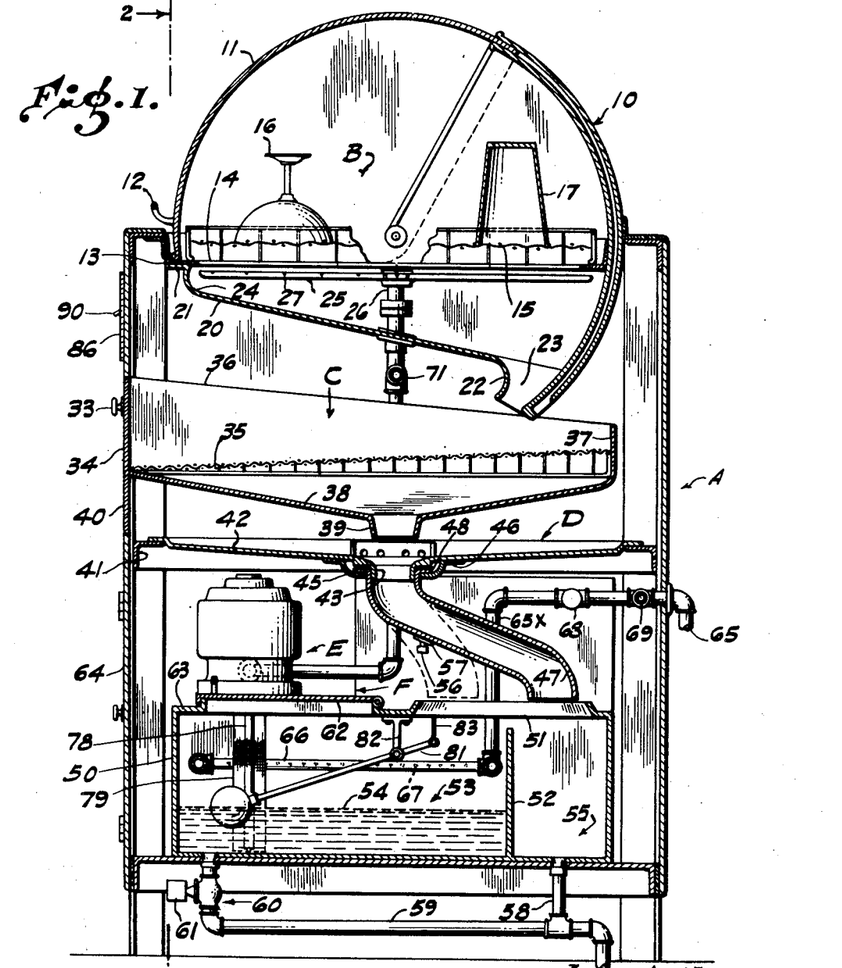
Fig. 1 is a vertical midsection of the complete machine, showing the top cover closed.
Figure 5:
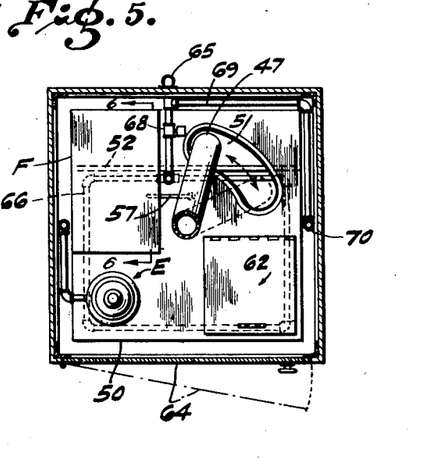

As shown in Figs. 1, 2 and 5, the hot water supply pipe 65 has a horizontal branch 69 which leads therefrom interiorly of the casing but between the solenoid controlled valve 68 and the adjacent wall of the casing. Said branch pipe 69 leads around an adjacent corner of the casing and is continued as a vertical run 70 which communicates with a horizontal pipe section 71 which terminates in a T-fitting 72, this fitting communicating with the lower end of the already mentioned supply pipe 26 for the rotatable spray pipe 25. Said pipe section 71 is furnished with a normally closed solenoid operated valve 73, and with a check valve 74, the latter valve being between said T-fitting and valve 73, and permitting flow toward said T-fitting.

From the opposite end of said T-fitting leads a horizontal pipe section 75 which is continued as downward run 76 which connects with the combination pump-motor E. Said pipe section 75 is provided with a check valve 77 which permits flow toward the T-fitting 72. The pump-motor entrains liquid from the reservoir 53 through a suction pipe 78 which is surrounded by a screen sleeve 79, spaced outwardly therefrom, to prevent foreign matter from being pumped from said reservoir.

Figure 12:
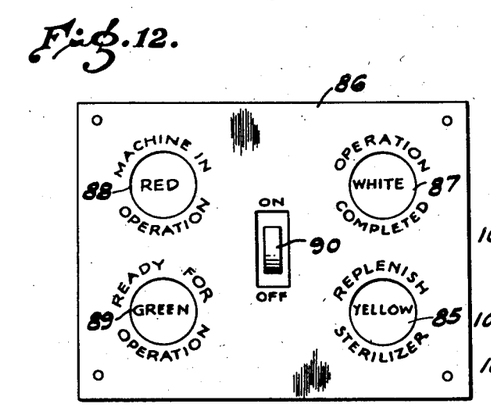
Fig. 12 is a front face view of the mounting plate for the master switch and the four signal lights indicative of the operations of the machine.

Automatic means, operable by the emptying of the reservoir 53, is provided to resupply water to said reservoir and to actuate a signal to notify the attendant to place additional sterilizing chemical into the water in said reservoir. This means includes a float-carrying lever 81 pivoted between its ends to a bracket 82 secured to the top wall of said reservoir. To the outer end of the short arm of said lever is pivoted a bifurcated rod 83 which actuates a standard liquid-level or float-controlled switch 84. Said switch (through a circuit described later) directs current through one of its contacts to the yellow lamp 85 carried by the signal board 86 (see Fig. 12), thus indicating to the attendant that a new supply of sterilizing chemical needs to be added to the body of hot water automatically reintroduced into said reservoir.

Describing further the signal board 86, in addition to said yellow lamp this board carries a white lamp 87, a red lamp 88, a green lamp 89 and the master switch 90; the operation of these parts carried by said board being described later in connection with the wiring diagram.

After a predetermined number of usings of the sterilizing solution 54 the machine automatically empties the reservoir 53. This is predetermined by the attendant setting a knob 91 carrying an indicating pointer 92. Said pointer cooperates with a graduated dial 93 located in a manually accessible situation on the front end of the housing F of the timing mechanism, as shown in Fig. 2. If the sterilizing solution possesses a high degree of potency the pointer will be set for a greater number of usings than if the solution were less potent, the dial being shown constructed to preindicate any desired number of usings up to twenty-two times.

Figure 11:
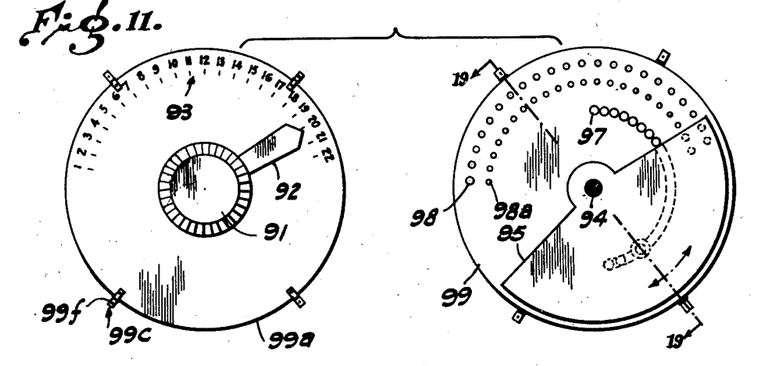
Fig. 11 is a view in the right hand portion of which is shown the block out switch for controlling the number of times the machine will operate on one preparation of the sterilizing solution, and in the left hand portion of which is shown the setting dial for said switch, together with the manually settable pointer settable to predetermine said number of times of operation.
Figures 15, 16, 17, 18, 19:
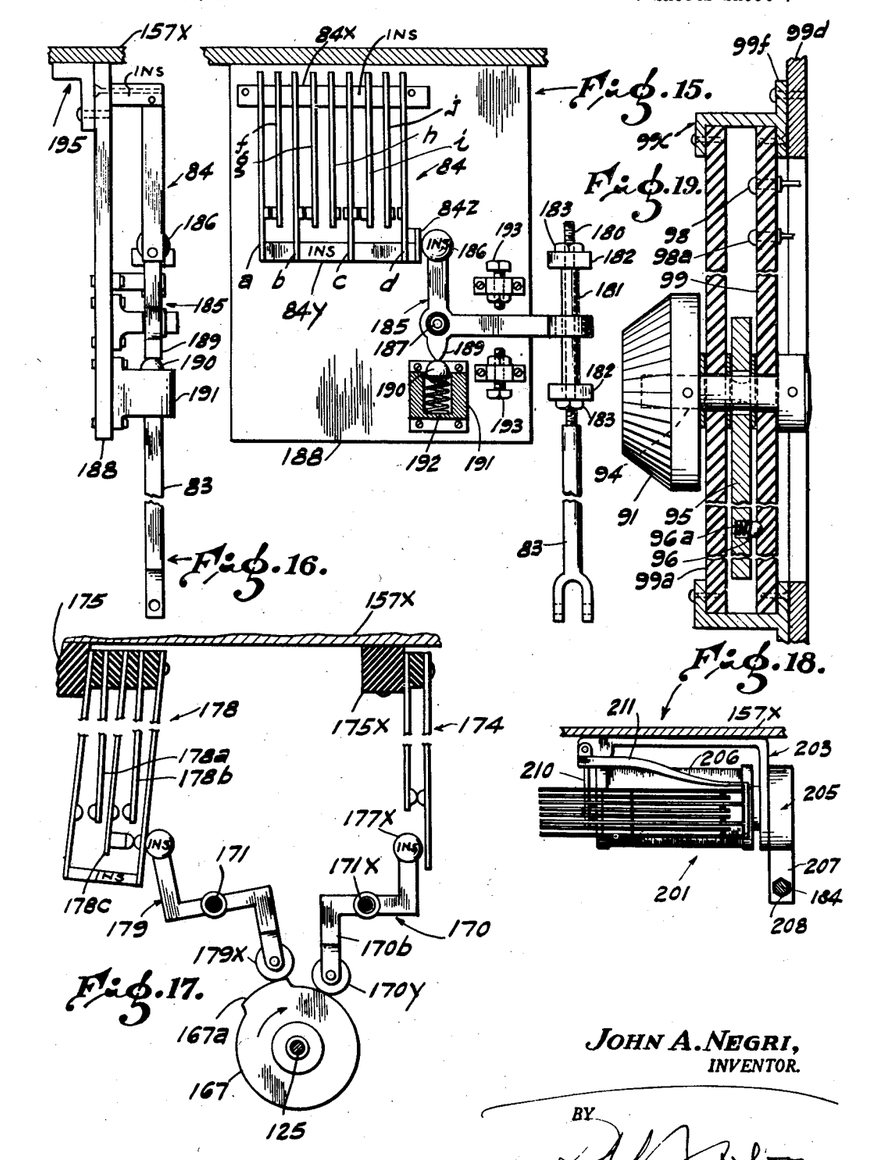
Fig. 15 is a front view of a float-actuated switch operating means (84 of Fig. 6).
Fig. 16 is a side elevation of the parts shown in Fig. 15.
Fig. 17 is a fragmentary section of a portion of the timing device taken on line 17—17 of Fig. 6.
Fig. 18 is a fragmentary section of a portion of the timing device taken on line 18—18 of Fig. 6.
Fig. 19 is a fragmentary sectional view of the block out switch and operating means therefor, a portion of the structure shown being sectioned on line 19—19 of Fig. 11. This view includes a fragmentary portion of the front wall of the casing F (Fig. 2), to which the device is attached.

Referring to Figs. 11 and 19, underlying and attached to the knob 91 by a shaft 94 is an approximately semicircular, contact-making plate 95 which turns with said knob and carries a globular, spring-pressed centering ball 96 which is at all times partly contained within a socket 96a within the back portion of said plate. Said ball cooperates with a series of indentations 97 to keep the straight edge of said contact plate after adjustment always circumferentially between consecutive points of the two series of arcuately arranged contact points 98 and 98a carried by the insulating plate 99. This multiple contact device also includes an insulating plate 99a in a parallel, spaced relation to said plate 99.

The block out switch plates 99 and 99a are shown mounted between four circumferentially spaced clips 99c fastened by screws to the front end wall 99d of the timing mechanism casing. Said clips have radially projecting flanges 99f to receive said screws.

Describing next the switch operating means whereby the machine is automatically put into operation by closing the door 11, a pendant, swingable plate 100 (see Fig. 14) is pivotally attached at 101 to the front portion of the casing. This plate is normally held at a backward inclination by reason of its front surface being engaged by the rear arm of an angularly S-shaped lever 102 which is pivotally supported at its lower angle on a pin 103. The lower end of this lever is in turn pivoted to the upper end of a vertical rod 104 working in guides 105 in opposition to the tension spring 106 and pivotally connected at its lower end to a bell crank lever 107 in turn pivoted to a horizontal rod 108 which is the final member of the rod assembly and operates the starting switch 109 (see Fig. 6) which sets into operation the motor 110, which drives the timing mechanism G.

Figures 6, 20:
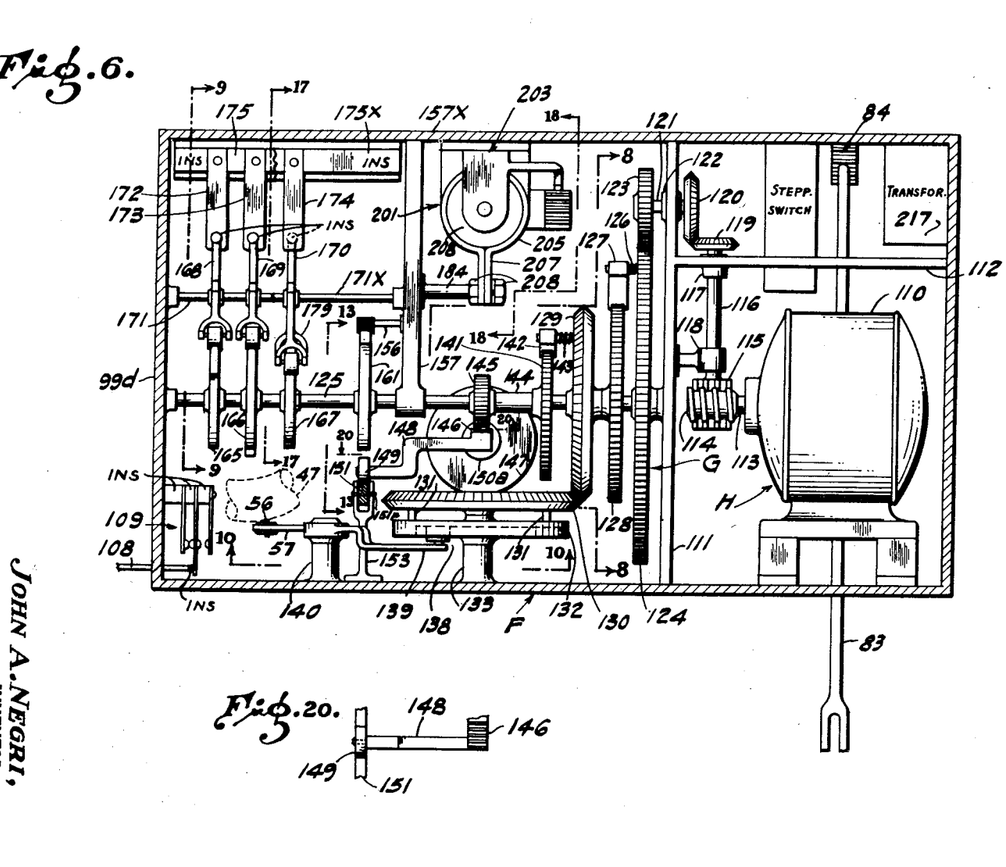
Fig. 6 is an enlarged section taken on line 6—6 of Fig. 5.
Fig. 20 is a fragmentary plan view taken on line 20—20 of Fig. 6.

The rectangular casing F of the timing mechanism, illustrated in vertical section in Fig. 6, is shown having a vertical bearing supporting member 111 which extends from the top to the bottom of said casing and a horizontal combined brace bar and bearing support 112 one end of which is secured to said member 111 and the opposite end of which is secured to the adjacent end wall of the casing.

Figure 8:
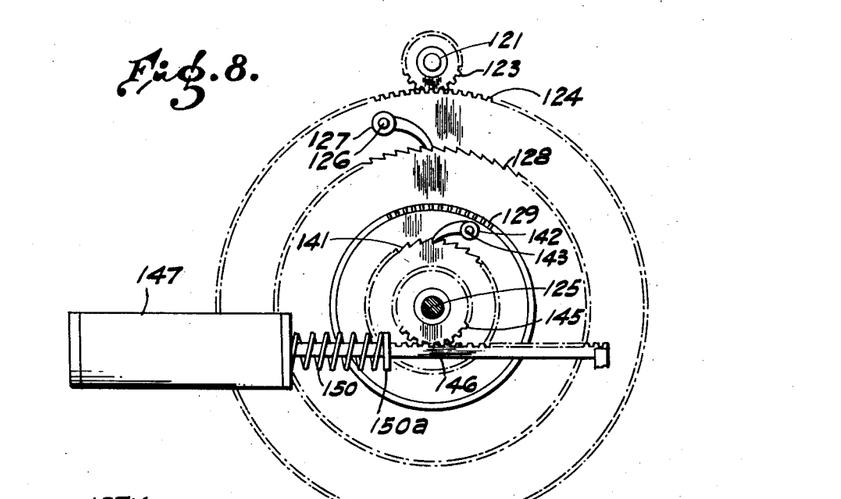
Fig. 8 is a section of a portion of the timing device taken on the planes indicated by angular line 8—8 on Fig. 6.

Within the lower right hand corner portion of said casing as viewed in Fig. 6 is mounted the already mentioned motor 110 which drives the timing mechanism shown in said casing leftward of the bearing support 111. The motor shaft 113 has fixed to it a worm 114 which meshes with a worm gear 115 fixed to a primary power transmission shaft 116, the latter shaft being supported near its upper end by a bearing 117 carried by the aforesaid brace bar 112, the lower end portion of this shaft passing through a combined bearing and bracket 118 carried by the member 111. To the upper end of shaft 116 is secured a bevel gear 119 which meshes with a bevel gear 120 fixed to a stub shaft 121 the bearing 122 of which is carried by the member 111. To the left end of said stub shaft is secured a pinion 123 (see also Fig. 8), in mesh with a large gear 124 loosely mounted upon the right end portion of a shaft 125, which has its right end portion bearing in the member 111, and the left end of said shaft having its bearing in the left hand end wall of the casing of the timing mechanism.

Said large gear 124 carries adjacent to its periphery a laterally projecting pin 126 upon which is mounted a spring-tensioned dog 127 which cooperates with a ratchet wheel 128 fixed to shaft 125. Adjacent to said ratchet wheel a bevel gear wheel 129 is keyed to the shaft 125, the latter gear meshing with a horizontal bevel gear 130 which has attached to it by pins 131 an underlying shuttle member 132, detailed in Fig. 10. An upstanding bearing structure 133 rotatably supports said gear and shuttle, said bearing structure having a diametrically reduced upper end portion 133x comprising said rotatable support.

Said shuttle member 132 has cut into its lower face a cam groove made up of an arcuate portion 135 with a large radius in relation to a shorter arcuate groove 136, both of these being concentric to the axis of rotation of the shuttle member; there being two short twin groove sections 137 whereby the long and short arcuate grooves are united so as to make an endless track for a cam roller 138 which workingly fits into the complete groove. Said cam roller is carried by one end of an arcuate lever 139 fulcrumed between its ends upon the bearing extension 140x of a pedestal 140 and having its opposite end pivoted to the already mentioned spout-swinging arm 57 which is connected to the already mentioned stud 56 carried by the swingable spout 47.

A ratchet wheel 141 at times acts upon a spring-pressed pawl 142 mounted upon a pin 143 carried by the peripheral portion of the gear 129. Said ratchet wheel has a leftward cylindrical hub extension 144 to which is fixed a gear 145, the double-wheel assembly thus provided being rotatably mounted upon the shaft 125. Said gear 145 is at times acted upon by the rack-carrying arm 146 (Fig. 13) operable by a solenoid 147. The outer end of said arm, in relation to said solenoid, has a rightangularly directed extension 148 upon which is pivotally mounted a small roller or wheel 149. Spring 150 restores arm 146 to normal position after retraction. Said spring acts between the solenoid and a disk 150a on arm 146.

The restoring mechanism which is now being described includes a lever assembly of which a cam-faced arm 151 forms a part, this arm having a cam shoulder 152 near one of its ends which is operatively related to the aforesaid roller 149. This mechanism (which includes other parts presently to be described) constitutes a means for returning the timing device shaft 125 to its starting point if the cycle of operation of said device is interrupted by lifting the cover 11 before a completion of the cycle. In this event the solenoid 147 becomes energized and its pull on the rack member 146 causes said member to rotate the aforesaid gear 145 in a clockwise manner (see arrow Fig. 13), turning with it ratchet wheel 141 which thereby causes the main shaft 125 to turn forward. At the beginning of this operation the leftward movement of roller 149 will cause said roller to act upon cam shoulder 152 of the lever arm 151. As the opposite end of arm 151 is pivotally supported at 151p upon a standard 153 this cam action will depress the obtusely angular bar 154 to the lower end of which the arm 151 is pivoted, and said bar will, in turn, swing downwardly the long end of stop lever 155 pivotally supported between its ends by a horizontal arm 156 that projects laterally from a pendant, elongated bearing member or hanger 157 which depends from the top wall 157x and which stabilizes the midlength portion of the main shaft 125. Said pendant bearing member 157 is made sufficiently broad from front to rear in relation to the casing to support the other bearing means hereinafter mentioned as connected therewith. The long arm of stop lever 155 has pivoted to it a gravity controlled terminal finger or pawl 158 which cannot swing down out of alinement with said lever because of the pawl's straight shoulder 158a abutting the adjacent shoulder 158s of the lever 155, but will swing up as provided for by the rounded shoulder 158b in case the tooth 160 of wheel 161 is vertically subjacent to it at a time when the long arm of lever 155 is tilted downwardly. A tension spring 162 connects the short arm of lever 155 with the bent portion of bar 154. Said wheel 161 is fixed to main shaft 125 and when the rotation of said wheel is arrested by pawl 158 determines the stopping point of said shaft when the restoring device has operated to return the timing mechanism to its starting point. When the solenoid is de-energized, as described later in connection with the wiring diagram, the spring 150 will act upon rack bar 146 to return the restoring assembly shown in Fig. 13 to normal position.

Figure 7:
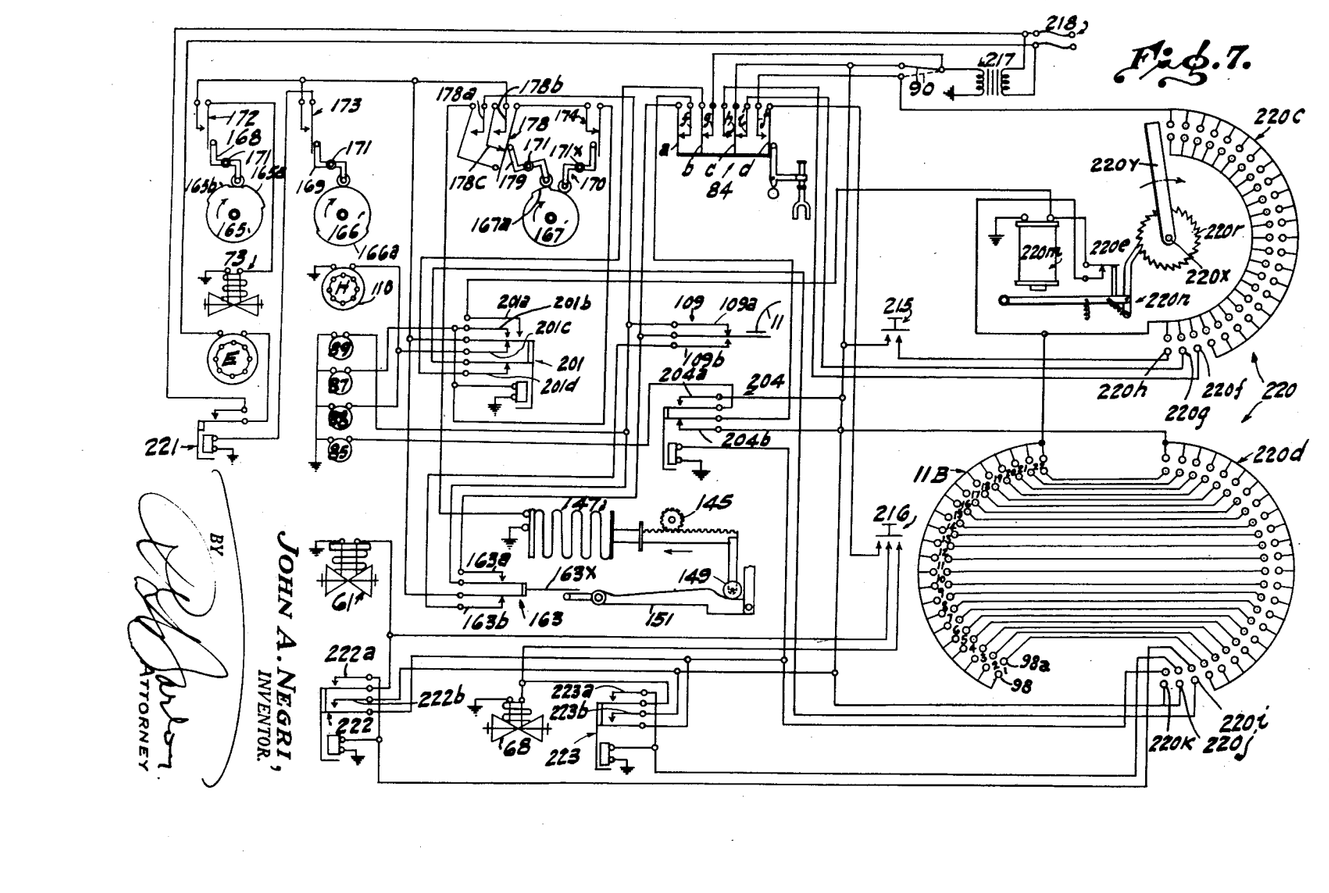
Fig. 7 is a complete diagram of the electrical wiring.

Depression of lever 151 tilts upwardly its heel portion 151a thereby raising extension 163x of switch 163 (see wiring diagram, Fig. 7).

Naming them from left to right, three cam wheels 165, 166 and 167 are shown in the left hand portion of the timing mechanism keyed to the main shaft 125, which respectively operate somewhat L-shaped switch operating arms or levers 168, 169, 170 and 179, levers 168, 169 and 179 being rockably mounted on a rear countershaft 171, and lever 170 being mounted on a front countershaft 171x. These four levers respectively cooperate with switch contacts 172, 173, 174 and 178, contacts 172, 173 and 178 being attached to a rear overhead bracket 175, but paired contacts 174, as viewed in Fig. 6, being nearer to the observer and being supported by a different bracket 175x. (See Fig. 17.)

Figures 9, 10:
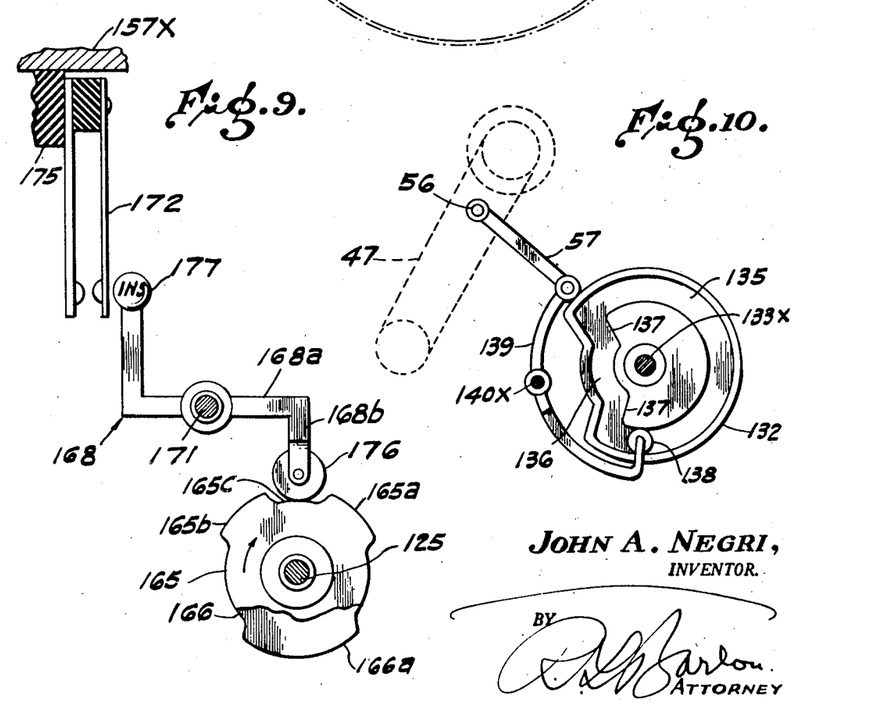
Figs. 9 and 10 are portioned sections of the timing device taken respectively on lines 9—9 and 10—10 of Fig. 6.

In Fig. 9 is detailed the means for operating the contacts 172, this means being duplicative of the adjacent means for operating the contacts 173, except as to the location of the actuating cam. This means for operating said contacts 172 includes a bifurcated downward extension 168b carried by the outer end of the horizontal limb 168a of the lever 168, said extension carrying an antifriction roller 176 acted upon by cam projections 165a and 165b each time cam wheel 165 rotates, there being a dwell 165c between said cam projections. Said lever 168 carries a globular knob 177 at its upper end which operates the adjacent arm of the switch 172.

In Fig. 9 the second lever 169 (see Fig. 6) is concealed by the lever 168 but the lower part of the first cam wheel 165 is broken away to disclose a portion of the second cam wheel 166 together with its single cam projection 166a having a longer operating face. It may be said here that all the cam projections of the cam wheels secured to shaft 125 occupy the proper circumferential positions in relation to said shaft and have cam faces of proper lengths to close the various switches they operate at the proper times and for intervals of the proper length.

The already mentioned cam wheel 167 is provided with a single cam projection 167a and is operatively related to the pair of switch arms 174 by means of the already mentioned lever 170, which lever though L-shaped in its upper part, has a reverse front-to-rear position. This lever carries at the lower end of its downward extension 170b an operating roller 170y and at its upper end an operating knob 177x.

As viewed in Fig. 6 the left hand portion of the rear switch supporting bracket 175 is uncovered by reason of a part of the front bracket 175x being broken away. Fig. 17 illustrates how the concealed portion of said bracket 175 supports an assembly of switch arms 178 which is operated by an angular lever 179. This lever is similar, both in form and front-to-rear positioning, to the lever 168 of Figs. 6 and 9, and therefore need not be further described, except to say that the roller 179x which it carries at its lower end is acted upon by the cam projection 167a a little before said projection reaches the roller 170y of lever 170.

The switch arm assemblies 172, 173, 174 and 178 are shown in a left to right sequence in the upper portion of the wiring diagram (Fig. 7), which is the same sequence as that in which they appear in Fig. 6, except that in the latter view the switch assembly 178 is not seen because it is concealed by the switch assembly 174. As these switch structures are of a conventional character they will be readily understood from the wiring diagram when their operation is later described. Reference has already been made to a float-operated rod 83 which at time operates a switch mechanism 84, the latter being illustrated in detail in Figs. 15 and 16. Following up the operating means for this switch from said rod 83, this rod has a diametrically reduced threaded axial extension 180 surrounded loosely by a sleeve 181 against each end of which abuts a collar 182, said sleeve being adjustably secured to said rod by nuts 183. This sleeve has a very loose fit through the outer end of the horizontal arm of an L-shaped lever 185, the outer end of the vertical arm of said lever carrying a knob 186 engageable with the switch 84. Said L-shaped lever is rockably supported at the junction of its arms by a pivot 187 carried by the board 188 upon which the switch is mounted. This part of the lever carries a downwardly directed pointed extension 189 which cooperates with a snap-action ball 190 mounted in a socketed member 191 attached to the board 188 and supported by a spiral compression spring 192. The rocking movements of the lever 185 are controlled by the twin adjustable stop means 193 carried by the board 188 above and below the horizontal arm of the L-shaped lever.

Describing more in detail the liquid level-controlled switch structure 84, this switch comprises a horizontal bracket member 84x attached to the board 188 and pendantly supporting the series of parallel, widely spaced apart contact-carrying spring arms a, b, c, and d, the lower ends of which are connected by a crossbar 84y having at one end an angularly directed abutment flange 84z against which the knob 186 acts, said knob being withdrawn therefrom when a rise in liquid level causes the upper collar 182 to swing lever 185 in a clockwise direction. Said pendant arms and crossbar structure is so tensioned as normally to move somewhat to the right of the neutral position thereof, shown in Fig. 15, and when it so moves three circuits are closed through the cooperation of intermediate contact-carrying arms f, g and i which respectively cooperate with said contact-carrying arms a, b and c. When the liquid level falls, the weight of the float raises the short arm of the lever which carries the float, thus raising rod 83 and causing the lower collar 182 carried thereby to raise the lower end of the L-shaped lever 185 thus forcing the knob 186 against the movable contact arm assembly and causing its contact-carrying arms c and d to respectively make contact with contact-carrying arms h and j provided for the purpose of controlling two circuits in addition to opening the three circuits which have already been mentioned.

The plate or switch-mounting board 188 is shown supported from the top wall 157x of the casing for the timing mechanism by suitable bracket structures 195.

In the upper portion of Fig. 6 is shown a conventional relay switch structure 201 which is detailed in Fig. 18. This switch structure forms part of the means for stopping the operation of the timing device after a complete cycle as well as other functions hereinafter described. It is supported, in part, from the wall 157x by suitable bracket structures 203, and is furnished with an additional lower supporting means of the nature of a bracket arm 184 extending horizontally from the hanger 157. A clamp structure 205 surrounds the magnet 206 and has paired lower arms 207 through which said arm 184 projects, clamping nuts 208 securing said clamp structure to said arm. When current is supplied to the magnet 206 of this switch structure through a circuit controlled as later described, its armature 210 is attracted and swings the contact-controlling frame 211 thus opening switches 201c and 201d and closing switches 201a and 201b.

The conventional switch structures 204, 223, 222 and 221 are located in the timing device casing F rearwardly of relay switch structure 201. Except for the number of contacts the aforesaid four switch structures are all constructed the same as the relay 201. Therefore, the latter relay having already been described, the remaining relays will not be described except in regard to their operation, which will be given in connection with the operation of the device explained in connection with the wiring diagram.

After the master switch 90 (upper left hand portion of Fig. 1) has been turned on, the sterilizing solution prepared in the tank 53, and glassware placed upside down on tray 14, the machine is ready to perform the required operation.

Figure 14:
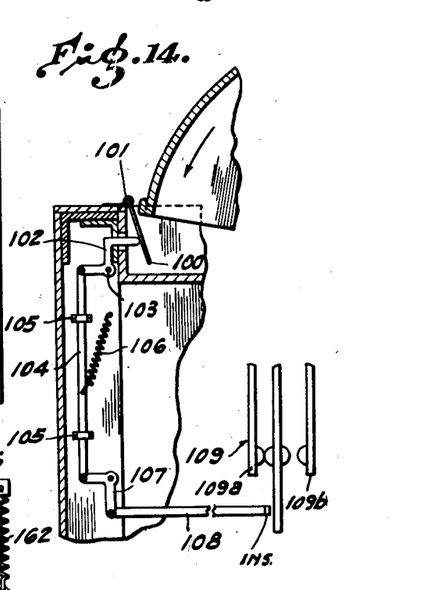
Fig. 14 is a fragmentary vertical section illustrating a cover operable switch control means for putting the machine into operation, by the closing movement of the cover.

The closing down of top cover 11 presses plate 100 outward which operates the rod assembly shown in Fig. 14 to in turn actuate switch 109 which sets the timing device in motion.

The first phase in the cycle of operation is the opening of electric valve 73. This allows hot water to come into the machine through pipes 65 and 70, past check valve 74 and to be ejected out of spray arms 25 against the glassware. Check valve 77 prevents water from flowing into piping 75. After the water is ejected it drops down onto slanting apron 20 and flows out of the wide outlet 23 which diffuses it into strainer tray C. The water next passes through the close mesh screen 35, but any refuse matter remains above the screen. The water then flows out through outlet 39, through swing-spout 47, and into the small tank 55, whence it drains out into pipe 58 and empties into the sewer line pipe 59. Valve 73 will remain open for approximately ninety seconds, after which it closes, and water will drain out of the machine for a period of about twenty seconds.

After the twenty second draining period, the swing-spout 47 is automatically moved to its alternate position over tank 53. This is the second phase in the cycle of operation. The pump E operates sucking the solution from tank 53 through pipe 78, ejects it through pipes 76, 75 past check valve 77 and it is finally ejected out of revolving spray arms 25 against the glassware. Check valve 74 prevents solution from flowing into piping 71. After being ejected, the solution drops onto apron 20 and flows out through its spout 23 and into tray C. It then passes through strainer screen 35, out of spout 39, through swing-spout 47 and back into the tank 53. The sterilizing solution makes this circuit for a period of approximately three minutes, after which the pump E stops and the solution is allowed to drain back into tank 53 for a period of about twenty seconds.

This second draining period is followed by the third phase in the cycle of operation. The swing-spout 47 is automatically returned to its first position over the small tank 55. Electric valve 73 opens permitting hot water to be ejected from the revolving spray arms 25 again. This rinsing operation lasts about thirty seconds after which valve 73 closes. The glassware has now been washed, sterilized and rinsed.

The above described cycle of operation can be repeated for as many times as is predetermined in the setting of the dial pointer 92 shown in Fig. 11 before it becomes necessary to place additional sterilizing chemical in the tank 53.

When the predetermined number of cycles of operation have been executed, electric drain valve 61 will open and the solution in the tank 53 will drain out through sewer line pipe 59 and into the sewer. As the float-ball reaches the bottom in the emptying of tank 53, electric valve 68 is opened and water flowing in through pipes 65 and 65x is ejected from pipe 66 in a spray against all four walls. After the water has flowed for a few moments thereby rinsing out tank 53, valve 61 which embodies a "slow releasing" solenoid, closes. Water continues to flow until it has reached its proper full level in the tank 53 and float-ball is raised to its height limit. Then valve 68 closes and after chemical has been placed in the tank 53 and the electric button 215 has been pressed the machine is in readiness to continue operations.

Except for the obviously necessary manual closing of cover 11, placing chemical in tank 53 and pressing the button 215, the above described mechanical functionings are all performed automatically, being controlled by the timing device shown in Fig. 6.

For the purpose of simplicity in illustrating the switching arrangements, only one side of the low voltage line beyond the transformer 217 (upper right hand portions of Figs. 6 and 7), is drawn. To avoid a superfluous amount of lines the other side is illustrated as negative and going to ground.

Commencing with the ordinary 110 volt alternating current line coming into the machine through fuses 218, the voltage is reduced to lower voltage by said transformer 217. The master switch 90 is indicated in the "on" position by the full line and in the "off" position by the dotted line. All switches shown in Fig. 7 are in position to correspond with the starting point of the timing device.

Figure 13:
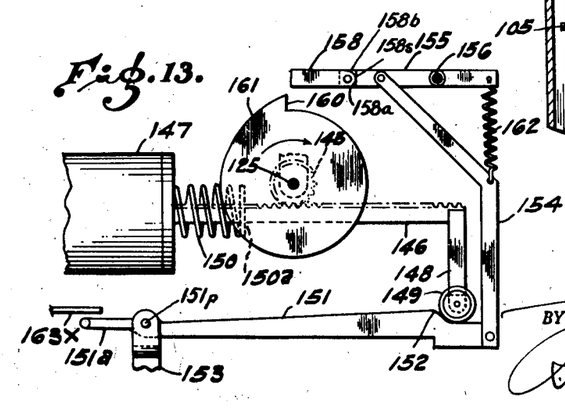
Fig. 13 is a section of a portion of the timing device taken on line 13—13 of Fig. 6.

Switch 109 (see also Fig. 14), is the switch affected by the closing of the cover 11. When the cover is open said switch is closed at 109a and open at 109b. This switch is inoperative if 204b or 84f is open. Switch 204b is open when the tank 53 is in the process of being emptied and filled, and remains open after this process until button 215 is pressed. Switch 84f is open when the float-ball is down and the tank 53 is empty. When the master switch 90 is "on," switch 204b closed and 84f closed, then 109a closed will light green light 89. The closing of cover 11 will open switch contact 109a and close 109b of the starting switch 109. This operation starts motor H and energizes light 88, provided that contacts 163b and 201c remain closed. Switch 163b is open when the restoring device shown in Fig. 13 is operating.

Switch 201c opens when the timing device has completed a cycle of operation, this being associated with the means for automatically stopping the timer motor H after a complete cycle of operation.

The means for stopping operation of the timing device after a complete cycle is through the medium of roller 167, rocker arm 179 and switch 178. During operation of the timing device, rocker arm 179 is in normal position and not on the raised section of roller 167 just before stopping, and contacts 178a and 178b are closed and contact 178c is open. As said rocker arm lifts, it closes 178c and there is a momentary contact between 178c and 178b just before 178b opens. This momentary contact energizes magnet on relay switch 201 lifting the armature. Closing of switch 201b immediately will hold this relay armature closed, and will also energize white light 87. Closing of switch 201a energizes magnet 220m causing the stepping switch to move one step forward. The opening of contact 201d is for the purpose of delaying the action on the drain valve 61 when the stepping switch 220 has reached this step, until the cover 11 is lifted and white light 87 is out. As arm 179 drops off of raised section, another momentary contact is made by 178b and 178c. However, since rocker arm 170 follows rocker arm 179 over the raised section, contact 174 will be open as arm 179 drops off, and the momentary contact of 178b and 178c will have no effect upon relay 201.

Switch 172 regulates water valve 73. Switch 173 regulates the operation of pump E through relay switch 221, because of the requirement for 110 volts to operate the pump motor.

After the timing device has started operating for several moments, rocker arm 179 will have dropped off the raised portion 167a of roller 167, and contact 178a will be closed. If between this time and the time that the timing device automatically stops, the cover 11 should be raised, closing contact 109a, the solenoid 147 of the restoring device will be energized. Action on member 151 closes 163a and opens 163b. Opening of 163b makes it impossible for the timing device to operate while the restoring device is operating. Closing 163a assures electrical energy to solenoid 147 until its function is completed, in the event that the cover 11 is closed down quickly breaking contact 109a before the timing device is restored to its starting point. Solenoid 147 is de-energized when contact 178a is opened.

The stepping switch which controls the number of times that one preparation of the solution in tank 53 can be used, consists of two levels of contacts 220c and 220d with twenty-five sets of contact points in each level. These contacts are closed by wiper 220y for level 220c and a similar wiper (not shown) for level 220d. Both wipers are attached to the shaft 220x and move in unison, each closing one set of contacts at a time on their respective levels. The shaft 220x is activated by the action of the armature and pawl assembly 220n on ratchet 220r, the magnet 220m providing the motivating force. The magnet 220m is energized at the conclusion of each operational cycle by the closing of 201a, moving the wipers one step forward on the levels 220c and 220d. Should the switch 90 be turned to the "off" position, then the magnet will be energized through any of the first twenty-two sets of contacts on level 220c. Continuous rotating action results on ratchet 220r because of the electrical energy being conducted through the interrupter switch 220e, until the wiper 220y reaches contact 220f where motion stops.

When contact 220f is closed, contact 220i is likewise closed, which energizes relay 222 thereby opening drain valve 61. When the solution in tank 53 is drained out, the action of the liquid level switch 84, by the opening of 84g will de-energize relay 222, thereby allowing drain valve 61 to close. This last mentioned function is independent of the position of the master switch 90. However, at the conclusion of this function all operations will cease if the switch 90 is in the "off" position. If the switch 90 is in the "on" position, operation of the timing device will proceed automatically. The closing of contact 84h provides electrical energy through contact 220f which is already closed to magnet 220m for moving it one step forward. This closes contacts 220g and 220j. The closing of 220j energizes relay 223, which by the closing of 223a opens water valve 68. It will be observed that the energizing of 223 closes 223b, and the energizing of relay 222 closes contact 222b. These two contacts 223b and 222b, when closed serve to energize relay 204. The opening of contact 204b will make it impossible for the motor of the timing device to operate if the cover 11 should happen to be closed at this time, closing contact 109b. The closing of contact 204a lights the yellow light 85.

After the water valve 68 has been open sufficient time to provide the required amount of water in tank 53 to raise the float-ball to the point of activating the liquid-level switch 84, contact 84i will close, conducting electricity through contact 220g which is already closed to magnet 220m, thereby causing the wipers to move one step forward. This will now place the wipers over contacts 220h and 220k. The opening of 220j de-energizes relay 223, allowing water valve 68 to close. The closing of 220k maintains the relay 204 energized. With contact 220h closed, the pressing of the prime-starting button 215 will move the wipers one step forward, closing the first sets of contacts on 220c level and 220d level. Opening of contact 220k de-energizes relay 204, opening 204a putting out light (yellow) 85, and closing 204b permitting the operation of motor 110 if desired by the closing of switch 109b.

Since it is the last three steps in the operation of the stepping switch which are directly related to the emptying and filling of the solution in tank 53, it is obvious that out of a total of twenty-five, the stepping switch must make twenty-two steps before reaching the twenty-third contact 220i which controls a definite function. This means that in normal operation, with all contacts open in 11B, one preparation of the solution in tank 53 may be used twenty-two times before action takes place to drain and refill said tank.

Now if we assume that twenty-two operations are not desirable and that less than this number are more desirable, the desired number is selected in Fig. 11 and adjustment made by turning the knob 91 and setting the pointer 92 on the selected number. Thus plate 95 closes all contacts except the number of contacts to remain open corresponding to the number selected on 93. Referring to the wiring diagram, for example, if in 11B all contacts numbered 13 to 22 inclusive were closed, and contacts numbered 1 to 12 inclusive were open, then as the wiper closed the first set of contacts on level 220d, which corresponds to contact 22 on 11B, it would cause the magnet 220m to be energized, stepping the switch forward. This action would continue until the wiper had reached the eleventh set of contacts on 220d, which corresponds to number 12 on 11B. Action would stop because number 12 on 11B would be open. Thus only twelve steps remain for the stepping switch to make before reaching the last three functional contacts.

Press-button 216 is effective only when switch 90 is in the "off" position, and when 84j is closed. It is the means for opening drain valve 61 and water valve 68 simultaneously, when it is desired to clean tank 53 after it has been emptied.

Although the description of the timing device already given will make its operation understood, the following résumé of its operation is added in order to clarify certain particulars thereof.

The timing device is a mechanical instrument for controlling through its relationship with electrical wiring and apparati, the entire automatic operations of the machine. It is driven by a small electric motor H (or 110), through a series of reduction gears 119, 120 and 123. One complete revolution of the main shaft 125 corresponds to a complete cycle of operation. The two pawl-carrying wheels and ratchets on the shaft are essential to the restoring device. Gear 123 drives larger gear 124, which floats on the main shaft. Pawl 127 which is attached to gear 124 drives ratchet 128, which is the means for conveying the driving force to the main shaft. Bevel gear 129 is also keyed to the main shaft and drives gear 130 with which it meshes. Pawl 142 which is attached to bevel gear 129 through the medium of the part 143, in normal operation rides over ratchet wheel 141 attached to small gear 145 and both the latter float on the main shaft. Attached to bevel gear 130 is shuttle 132 which provides the means for moving the swing-spout 47 to its alternate positions. The rollers 165, 166 and 167 are attached to the main shaft in a manner that their raised sections will lift the rocking arms 168, 169, 170 and 179 in their proper sequence and in lifting, operate switches 172, 173, 174 and 178.

The restoring device is a means for returning the timing device to its starting point if the cycle of operation is interrupted by the lifting of the cover 11 before completion of the cycle. In this event solenoid 147 becomes energized and the pull on gear track 146 causes gear 145 and ratchet wheel 141 to rotate clockwise against the pawl 142 thus turning the main shaft. The motion of roller 149 will depress member 151 downward, which through member 154 will pull stop member 158 down onto roller 161. When raised section 160 comes around and stops against member 158 the position of the main shaft will be at its starting point, and the de-energizing of solenoid 147 will permit the restoring assembly (Fig. 13) to return to its normal condition.

What is claimed is:

1. In a machine of the kind described, a casing including a sterilizing tank, means mounted upon said casing to support glassware in an inverted position for washing, piping supported by said casing and provided with a spray delivery portion positioned to direct a spray against the underside of the aforesaid glassware, said piping communicating with a water pressure supply, a motor driven pump connected with said piping, means to supply a sterilizing solution from said sterilizing tank to said pump, an electrically operated valve for controlling the water supply in said piping, electric means to operate said valve, a mechanical timing device, and conductors forming electric circuits having switches which are operated by said timing device at predetermined intervals to operate said valve and activate the motor of said pump in successive cycles so as to spray said sterilizing solution from said sterilizing tank upon the glassware between times when water is sprayed thereupon from said water pressure supply.

2. The subject matter of claim 1, and said timing device being constructed and arranged to cause a material amount of time to elapse for drainage between the completion of a water spraying operation and the beginning of a spraying on of the sterilizing solution.

3. In a machine of the kind described, a casing, means mounted upon said casing to support glassware in an inverted position for washing, piping supported by said casing and provided with a spray delivery portion positioned to direct a spray against the underside of the aforesaid inverted glassware, a motor driven pump with which said spray delivery portion of said piping is connected, a tank containing a sterilizing solution, conduit means to conduct said solution to said pump, an electric current supply means operatively connected with the motor of said pump, outlet means for said tank, an electric valve device connected with said electric current supply means to open and close said outlet means, and a mechanical timing device constructed and arranged to supply current to operate said pump at intervals a predetermined number of times and thereupon to open said electric valve device and allow the contents of said tank to discharge.

4. The subject matter of claim 3, and said electric supply means including a multiple contact switch which is electrically connected with said timing device and which is settable to predetermine the number of times said pump will operate to spray said solution upon the glassware before the contents of said tank will discharge.

5. The subject matter of claim 3, and said timing device including a shaft, a motor operatively connected with said shaft to rotate it, a series of cam members mounted on said shaft, and electric switches actuated by said cam members at predetermined intervals and in a predetermined sequence.

6. In a machine of the kind described, a casing, means mounted upon said casing to support glassware in an inverted position for washing, piping supported by said casing and provided with a spray delivery portion positioned to direct a spray against the underside of the aforesaid inverted glassware, a motor driven pump with which said spray delivery portion of said piping is connected, a tank containing a sterilizing solution, conduit means to conduct said solution to said pump, an electric current supply means operatively connected with the motor of said pump, outlet means for said tank, an electric valve device connected wtih said electric current supply means to open and close said outlet means, a mechanical timing device constructed and arranged to supply current to operate said pump at intervals a predetermined number of times and thereupon to open said electric valve device and allow the contents of said tank to discharge, said piping comprising a second spray delivery portion positioned to direct a cleansing spray of water against the interior of said tank after the aforesaid discharge of the sterilizing solution therefrom, and valve means positioned to control the supply of water to said second spray delivery pipe portion, the latter valve means being operatively related to said timing device and opened by the latter for a short interval only to wash out and for re-filling said tank after the aforesaid discharge of the contents thereof.

7. The subject matter of claim 6, and a signal means operatively connected with said timing device so as to be actuated thereby upon the aforesaid washing out of said tank.

8. In a machine of the kind described, a casing, means mounted upon said casing to support glasses or like articles in a position to be sprayed, means mounted upon said casing to direct a spray of water upon said articles to perform an initial cleansing operation, means carried by said casing in a cooperative relation to said spraying means to spray a sterilizing solution against said articles subsequently to said water spraying operation, means carried by said casing in a cooperative relation to both of said spraying means to direct a spray of rinsing water upon said articles subsequently to the aforesaid sterilizing operation, and a timing device operatively related to all three of said spraying means to actuate them in a properly timed sequence, said timing device comprising a motor, a shaft continuously rotated thereby during the operation of the machine, a cam wheel mounted on and rotating with said shaft, said cam wheel having a plurality of cam projections which are located in different circumferential positions thereon, means operable by one of said cam projections to control one of the aforesaid sprayings, and means operable by another of said cam projections to control another of said spraying operations.

9. In a machine of the kind described, the combination with a casing, means mounted thereon to support articles in a position to have different cleansing liquids directed against them, a conduit assembly having electrically operable valves to enable said conduit assembly to supply separately in sequence and throughout repeated cycles said cleansing liquids, and delivery means associated with said conduit assembly to direct the supplied liquids against the articles to be cleansed; of a mechanical timing device to operate in proper sequence the valves of said conduit assembly, said timing device comprising a motor, a shaft rotated continuously by said motor during the operation of the machine, a driving bevel gear fixed to said shaft to rotate therewith, a driven bevel gear in mesh with said driving gear, means comprising a shuttle operatively connected to said driven gear, a swingable spout mounted upon said casing in a position to swing to deliver one of said liquids repeatedly to one point of delivery and another of said liquids in the intervening periods to another point of delivery, means operatively connected to said shuttle for moving said swingable spout to and from said alternate positions, and electrical circuits including switching means for operating the aforesaid valves, said switching means being operatively related to said timing device.

10. In a machine of the kind described, a casing, means to support upon said casing articles in a position to have cleansing liquids directed against them, conduit means mounted upon said casing to deliver a plurality of different cleansing liquids against said articles at different consecutive times, thus making up a series of stages of operation in a predetermined number of cycles, a combined mechanical and electrical means mounted upon said casing to control the operation of the aforesaid cycular liquid delivery means, and electric signals operatively connected with the last recited means to visually indicate when the machine is prepared to perform said stages, when the aforesaid various stages are taking place, and when the aforesaid stages have been performed.

11. The subject matter of claim 10, and a cover supported upon said casing for closing over the space superjacent to the aforesaid articles supported for cleansing, said combined electrical and mechanical means being put into operation by the closing of said cover, and when so put into operation performing a predetermined number of complete said stages of operation unless said cover is in the meantime again opened, said combined electrical and mechanical means including mechanism to restore said combined electrical and mechanical means to normal starting position when said cover is again closed.

12. In a machine of the kind described, a casing, means to support upon said casing articles in a position to have cleansing liquids directed against them, conduit means mounted upon said casing to deliver a plurality of different cleansing liquids against said articles at different consecutive times, thus making up a series of stages of operation in a predetermined number of cycles, a combined mechanical and electrical means mounted upon said casing to control the operation of the aforesaid series of stages of operation, electric signals operatively connected with the last recited means to indicate the status quo of the machine, a cover supported upon said casing for closing over the space superjacent to the aforesaid articles supported for cleansing, said combined electrical and mechanical means being put into operation by the closing of said cover, and when so put into operation performing a predetermined number of complete said stages of operation unless said cover is in the meantime again opened, said combined electrical and mechanical means including mechanism to restore said combined electrical and mechanical means to normal starting position when said cover is again closed, at least one of said cleansing liquids being a sterilizing solution, a reservoir from which said solution is supplied and to which it is returned in each of the aforesaid stages of operation, means including a water supply conduit for said reservoir and operable by said combined mechanical and electrical means automatically to empty said tank and refill it with water upon the completion of the aforesaid cycle having a predetermined number of repetitions of the aforesaid stages of operation, and additional signal means operable by said combined mechanical and electrical means to indicate the necessity for re-supplying to said refilled reservoir a sterilizing chemical.

13. The subject matter of claim 12, and an electrically operable valve positioned to control the supply of water through said conduit, said valve being automatically opened by said combined mechanical and electrical means, maintained open till the required amount of water has been resupplied to said tank and then automatically closed by the last recited means.

14. In a machine of the kind described, a casing including a sterilizing solution tank, means mounted upon said casing to support glassware in an inverted position for washing, piping supported by said casing and provided with a spray delivery portion positioned to direct a fluid spray against the underside of the aforesaid inverted glassware, a pipe section having one end portion connectable with a water pressure supply and an opposite end portion connectable with a means for supplying a sterilizing solution from said sterilizing tank under pressure, said spray delivery portion of said piping leading from the midlength portion of said pipe section, a check valve in said pipe section at each side of the midlength portion thereof wherepast to deliver alternately first a water spray from said water supply to said glassware and then a sterilizing spray from said sterilizing tank to said glassware, and a mechanical timing device operatively connected with the water spraying and sterilizing spraying mechanism to time properly the spraying of water and of sterilizing solution upon the glassware.

15. In a machine of the kind described, a casing, means to support upon said casing articles in a position to have cleansing liquids directed against them, conduit means mounted upon said casing to deliver a plurality of different cleansing liquids against said articles at different consecutive times, thus making up a series of stages of operation in a predetermined number of cycles, a combined mechanical and electrical means mounted upon said casing to control the operation of the aforesaid cycular liquid delivery means, and a cover supported upon said casing for closing over the space superjacent to the aforesaid articles supported for cleansing, said combined electrical and mechanical means being put into operation by the closing of said cover, and when so put into operation performing a predetermined number of complete said stages of operation unless said cover is in the meantime again opened, said combined electrical and mechanical means including mechanism to restore said combined electrical and mechanical means to normal starting position in the event the cycle of operation of said machine is interrupted by the lifting of said cover.

16. In a machine of the kind described, a casing, means mounted upon said casing to support glassware in a position for washing, piping supported by said casing and provided with a spray delivery portion positioned to direct a spray against said glassware, a motor driven pump with which said spray delivery portion of said piping is connected, a tank containing a sterilizing solution, conduit means to conduct said solution to said pump, an electric current supply means operatively connected with the motor of said pump, outlet means for said tank, an electric valve device connected with said electric current supply means to open and close said outlet means, and a mechanical timing device constructed and arranged to supply current to operate said pump at intervals a predetermined number of times and thereupon to open said electric valve device and allow the contents of said tank to discharge through its outlet.

17. In a machine of the kind described, a cabinet casing including a drain receptacle and a sterilizing solution tank, a compartment mounted in said casing above said receptacle and tank to enclose objects to be washed, sterilized and rinsed in successive cycles, conduit means carried by said casing to entrain water under pressure into said compartment to wash and rinse said objects, means carried by said casing to conduct a sterilizing solution into said compartment from said sterilizing solution tank to sterilize objects between said washing and rinsing operations, a common controllable means carried by said casing for alternately conducting from said compartment the washing and rinsing solutions into said drain receptacle and said sterilizing solution into said sterilizing solution tank, and means carried by said casing to automatically empty said sterilizing tank after a predetermined number of usings of the sterilizing solution contained therein.

18. In a machine of the kind described, a cabinet casing including a drain receptacle and a sterilizing solution tank, a compartment mounted in said casing above said receptacle and tank to enclose objects to be washed, sterilized and rinsed in successive cycles, conduit means carried by said casing to entrain water under pressure into said compartment to wash and rinse said objects, means carried by said casing to conduct a sterilizing solution into said compartment from said sterilizing solution tank to sterilize objects between said washing and rinsing operations, a common controllable means carried by said casing for alternately conducting from said compartment the washing and rinsing solutions into said drain receptacle and said sterilizing solution into said sterilizing solution tank, and means carried by said casing to automatically empty said sterilizing tank after a predetermined number of usings of the sterilizing solution contained therein, said means comprising a pointer cooperating with a graduated dial manually settable to the desired number of usings.

19. In a machine of the kind described, a cabinet casing including a drain receptacle and a sterilizing solution tank, a compartment mounted in said casing above said receptacle and tank to enclose objects to be washed, sterilized and rinsed in successive cycles, conduit means carried by said casing to entrain water under pressure into said compartment to wash and rinse said objects, means carried by said casing to conduct a sterilizing solution into said compartment from said sterilizing solution tank to sterilize objects between said washing and rinsing operations, a common controllable means carried by said casing for alternately conducting from said compartment the washing and rinsing solutions into said drain receptacle and said sterilizing solution into said sterilizing solution tank, means carried by said casing to automatically empty said sterilizing tank after a predetermined number of usings of the sterilizing solution contained therein, said means comprising a float-carrying lever pivoted between its ends to a bracket carried by the top of said tank, a switch, and means operatively connected to said lever to actuate said switch.

JOHN A. NEGRI.

REFERENCES CITED

The following references are of record in the file of this patent:

UNITED STATES PATENTS

| Number | Name | Date |
|---|---|---|
| 821,250 | Miller | May 22, 1906 |
| 1,323,216 | Cornwall et al. | Nov. 25, 1919 |
| 1,452,710 | Schmelzer | Apr. 24, 1923 |
| 1,495,473 | Fitzgerald | May 27, 1924 |
| 1,633,396 | Clarin | June 21, 1927 |
| 1,670,611 | Couch | May 22, 1928 |
| 1,927,665 | Kirby | Sept. 19, 1933 |
| 1,980,064 | Johnston | Nov. 6, 1934 |
| 2,154,559 | Bilde | Apr. 18, 1939 |
| 2,155,272 | Jones | Apr. 18, 1939 |
| 2,279,619 | Fisher | Apr. 14, 1942 |
| 2,314,332 | Ferris | Mar. 23, 1943 |